United States Patent
Karr et al.

(10) Patent No.: US 10,656,858 B1
(45) Date of Patent: May 19, 2020

(54) DEDUPLICATION FEATURING VARIABLE-SIZE DUPLICATE DATA DETECTION AND FIXED-SIZE DATA SEGMENT SHARING

(71) Applicant: Veritas Technologies LLC, Mountain View, CA (US)

(72) Inventors: Ronald Karr, Palo Alto, CA (US); Graham Bromley, Dublin, CA (US); Deepak Patil, Roseville, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 167 days.

(21) Appl. No.: 15/288,001

(22) Filed: Oct. 7, 2016

Related U.S. Application Data (63) Continuation of application No. 13/716,123, filed on Dec. 15, 2012, now Pat. No. 9,465,808.

(51) Int. Cl.
*G06F 3/06* (2006.01)

(52) U.S. Cl.
CPC ............ *G06F 3/0641* (2013.01); *G06F 3/067* (2013.01); *G06F 3/0608* (2013.01); *G06F 3/0644* (2013.01); *G06F 3/0659* (2013.01)

(58) Field of Classification Search
CPC ........... G06F 17/3015; G06F 17/30156; G06F 17/30159; G06F 3/0641; G06F 3/0608; G06F 3/0644; G06F 3/0659; G06F 3/067; G06F 16/174; G06F 16/1744; G06F 16/1748
USPC ........................................ 707/687, 692, 694
See application file for complete search history.

(56) References Cited

U.S. PATENT DOCUMENTS

| | | |
|---|---|---|
| 5,990,810 A | 11/1999 | Williams |
| 7,822,939 B1 | 10/2010 | Veprinsky et al. |
| 7,921,086 B1 | 4/2011 | Bromley et al. |
| 8,234,468 B1 | 7/2012 | Deshmukh et al. |
| 8,280,854 B1 | 10/2012 | Emmert |
| 8,370,309 B1 * | 2/2013 | Ramarao ........... G06F 17/30156 707/664 |
| 9,075,532 B1 | 7/2015 | Bromley |
| 2008/0244204 A1 | 10/2008 | Cremelie et al. |
| 2008/0310628 A1 | 12/2008 | Fujioka et al. |

(Continued)

*Primary Examiner* — Hares Jami
(74) *Attorney, Agent, or Firm* — Campbell Stephenson LLP (57) ABSTRACT

A hybrid deduplication system operates to detect variable-sized deduplication matches, while performing the storage deduplication on fixed-size segments of data. The hybrid deduplication system calculates unique identifiers for variable-sized sections of data within a data stream being written to a deduplicated data store. The hybrid deduplication system then compares those newly-calculated identifiers to identifiers of variable-sized sections of data that have already been stored within the deduplicated data store. If a match is found, the hybrid deduplication system identifies the location of each of the fixed-size data segment(s), already stored in the deduplicated data store, that include the identified variable-sized section of data. Instead of writing the sections that match already-existing sections to the deduplicated data store, the hybrid deduplication system simply causes the creation of a reference to the identified storage locations, indicating that the data stream being written includes the data in these pre-existing storage locations.

9 Claims, 5 Drawing Sheets

(56) References Cited

U.S. PATENT DOCUMENTS

| | | |
|---|---|---|
| 2009/0083563 A1 | 3/2009 | Murase |
| 2010/0031086 A1 | 2/2010 | Leppard |
| 2010/0058013 A1 | 3/2010 | Gelson et al. |
| 2010/0077013 A1 | 3/2010 | Clements et al. |
| 2010/0077161 A1 | 3/2010 | Stoakes et al. |
| 2010/0094817 A1 | 4/2010 | Ben-Shaul et al. |
| 2010/0106754 A1 | 4/2010 | Condit et al. |
| 2010/0198797 A1 | 8/2010 | Wideman |
| 2011/0099154 A1 | 4/2011 | Maydew et al. |
| 2011/0231362 A1 | 9/2011 | Attarde et al. |
| 2011/0307447 A1 | 12/2011 | Sabaa et al. |
| 2012/0036319 A1* | 2/2012 | Bondurant ............ G06F 3/0608 711/111 |
| 2012/0124011 A1 | 5/2012 | Spackman et al. |
| 2013/0212074 A1 | 8/2013 | Romanski et al. |
| 2014/0114934 A1* | 4/2014 | Chakraborty ......... G06F 3/0608 707/692 |

* cited by examiner

DEDUPLICATION FEATURING VARIABLE-SIZE DUPLICATE DATA DETECTION AND FIXED-SIZE DATA SEGMENT SHARING

CROSS-REFERENCE TO RELATED APPLICATIONS

The present patent application is a continuation of patent application Ser. No. 13/716,123, filed Dec. 15, 2012, which issued as U.S. Pat. No. 9,465,808, on Oct. 11, 2016, and entitled "Deduplication Featuring Variable-Size Duplicate Data Detection and Fixed-Size Data Segment Sharing," which is hereby incorporated by reference herein, in its entirety and for all purposes.

FIELD OF THE INVENTION

This invention relates to data storage and, more particularly, data deduplication.

DESCRIPTION OF THE RELATED ART

Data deduplication is a technique used to reduce storage space requirements for systems that maintain multiple copies of the same data. Instead of storing each copy of that data separately (such that N copies of an X-byte item would require N×X bytes of storage), a data deduplication system only needs to store a single copy (requiring only X bytes of storage). A data deduplication system also maintains metadata that tracks the number of copies represented by a given item in the deduplicated storage area, which allows the system to operate, from a user perspective, like a traditional storage system. For example, the metadata ensures that an item will not be deleted until all of the copies it represents have been deleted.

Existing deduplication techniques tend to either work on fixed-sized units of storage (e.g., blocks or fixed-size sets of blocks) or on variable-sized items of data such as files. Unfortunately, both techniques have their own inefficiencies. Techniques that operate only on fixed-size units of storage may miss opportunities to deduplicate content that can be aligned differently within the fixed-sized units each time that content is repeated. On the other hand, systems that operate on variable-sized items often require an undesirable amount of overhead to maintain metadata and the like.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A hybrid deduplication system operates to detect variable-sized deduplication matches, while performing the storage deduplication on fixed-size segments of data. To do this, the hybrid deduplication system calculates unique identifiers for variable-sized sections of data within each data stream being written to a deduplicated data store. The hybrid deduplication system then compares those newly-calculated identifiers to identifiers of variable-sized sections of data that have already been stored within the deduplicated data store. If a match is found, the hybrid deduplication system identifies the location of each of the fixed-size data segment(s), already stored in the deduplicated data store, that include the identified variable-sized section of data. Instead of writing the sections that match already-existing sections to the deduplicated data store, the hybrid deduplication system simply causes the creation of a reference to the identified storage locations, indicating that the data stream being written includes the data in these pre-existing storage locations. The hybrid deduplication system also writes the sections of the data stream for which matches were not found to the deduplicated data store, while storing the identifiers calculated for those sections for later use in locating deduplication matches.

Figure 1:
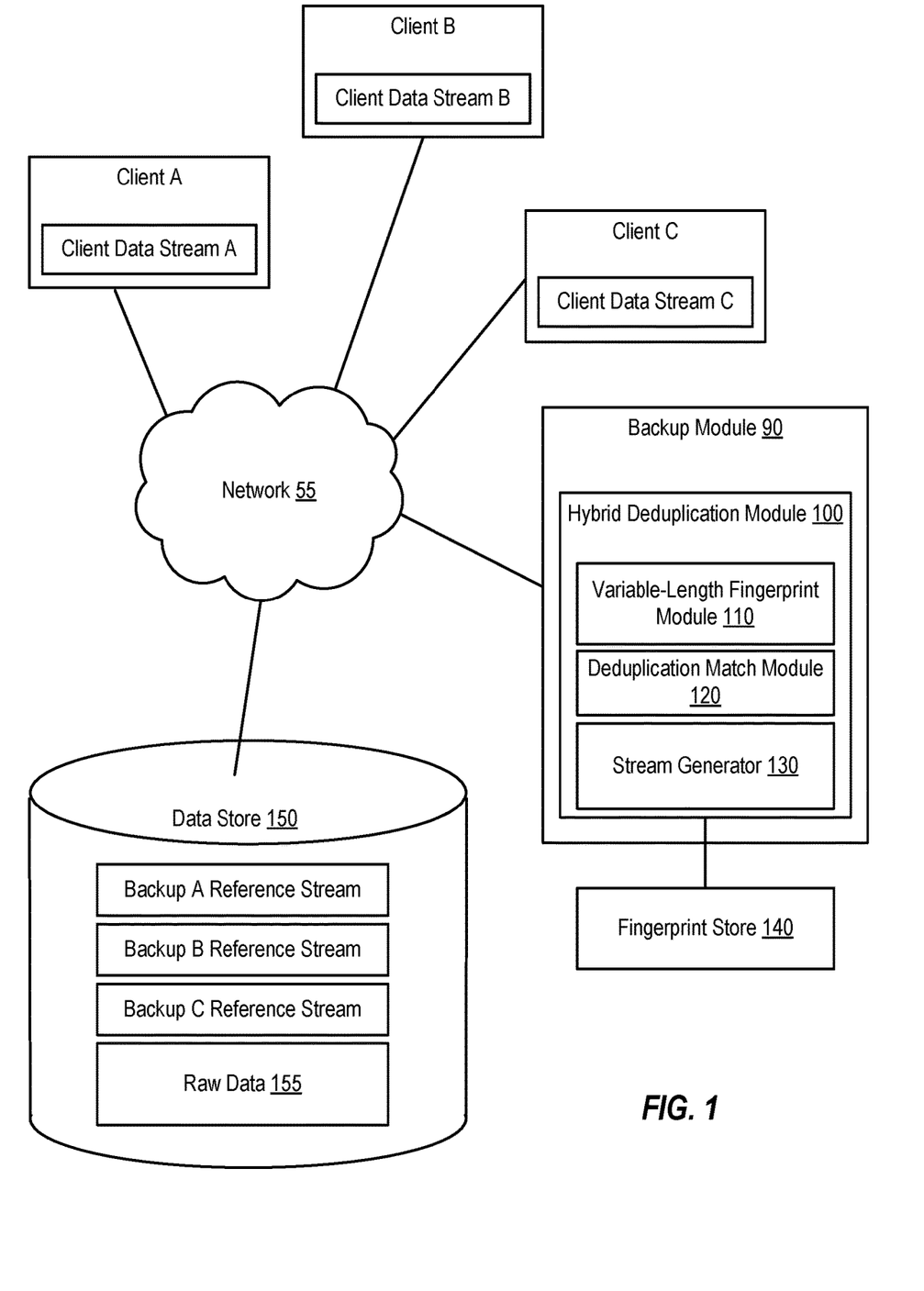
FIG. 1 is a block diagram of a hybrid data deduplication system, according to one embodiment of the present invention.

FIG. 1 is a block diagram of a computing environment that performs hybrid deduplication. As shown, the computing environment includes three client computing systems: Client A, Client B, and Client C. Each client has a respective client data stream, which can include application data used by each client and/or user data generated by operating one or more applications on the client. Client A has Client Data Stream A, and Client B has Client Data Stream B. Client C also has Client Data Stream B.

Clients A-C (collectively referred to as simply clients) are coupled to backup module 90 by network 55. Network 55 can be implemented using a Wide Area Network (WAN) such as the Internet, one or more Local Area Networks (LANs), and/or one or more Storage Area Networks (SANs), as well as various underlying technologies, including wireless links, fiber optic cables, electrical cables, and the like.

Backup module 90 is configured to backup the data streams generated by the clients by creating a point-in-time copy of each data stream and then storing that point-in-time copy and associated metadata as a backup data stream within data store 150. Each backup data stream includes a reference stream and a data stream. The data streams for all of the stored backup data streams are stored as part of a collection of raw data 155, which is maintained as a deduplicated data store by a hybrid deduplication module 100 within backup module 90. The reference streams for each backup stream identify which of the fixed-size segments within raw data 155 belong to each particular backup stream. Thus, Backup A Reference Stream is the reference stream for the backup of Client Data Stream A and identifies the fixed-size data segments within raw data 155 that make up the data stream of that backup. Similarly, Backup B Reference Stream is the reference stream for the backup of Client Data Stream B and identifies the fixed-size data segments within raw data 155 that make up the data stream of the backup of Client Data Stream B. Backup C Reference Stream is the reference stream for the backup of Client Data Stream C and identifies the fixed-size data segments within raw data 155 that make up the data stream of the backup of Client Data Stream C. As explained in more detail below, multiple different reference streams can refer to the same fixed-size data segment within raw data 155, such that a single fixed-size data segment can contain data that is included in multiple backup data streams.

As noted above, backup module 90 includes hybrid deduplication module 100, which performs hybrid data deduplication on backup streams generated by backup module 90 in order to maintain raw data 155 as a deduplicated data store. Hybrid deduplication module 100 includes a variable-length fingerprint module 110 that generates unique identifiers, referred to herein as fingerprints, on several variable-length sections of data within each backup stream generated by backup module 90. Variable-length fingerprint module 110 can divide a backup stream into several variable-length sections using any of a variety of techniques, like Rabin fingerprint sliding windows. In some embodiments, there may be minimum and/or maximum sizes specified for the variable-length sections into which data streams can be divided. Some of the variable-length sections into which a data stream is divided may be overlapping, in at least some embodiments.

For each variable-length section into which the data stream has been divided, variable-length fingerprint module 110 calculates a unique identifier, or fingerprint. Each fingerprint can be generated using one or more of a variety of checksum-, hash-, or other fingerprint-generating algorithms (It is noted that the technique used to generate fingerprints may not guarantee that every possible fingerprint will be unique; however, the technique will likely guarantee that collisions, which are situations in which two different sections of data have the same fingerprint, will be rare. As such, a technique for detecting collisions may also be implemented.)

Deduplication match module 120 within hybrid deduplication module 100 detects deduplication matches (i.e., sections of data that have the same content) on variable-length sections of data, based upon the fingerprints generated by variable-length fingerprint module 110. To detect a match, deduplication match module 120 compares a newly-generated fingerprint provided by variable-length fingerprint module 110 to one or more of a set of stored fingerprints. The stored fingerprints are maintained in fingerprint store 140. It is noted that all or part of fingerprint store 140 may be cached for faster access, and/or that information indexing into fingerprint store 140 can be so cached.

Fingerprint store 140 can, in some embodiments, have a maximum allowable size. When this size is exceeded, certain fingerprints may be deleted from and/or overwritten within the fingerprint store in order to accommodate the storage of newer fingerprints. For example, fingerprint store 140 can be maintained as a circular queue, where, once the maximum size is reached, newer entries will overwrite the oldest entries. Alternatively, a least-recently-used or other cache replacement scheme can be used to control when entries in fingerprint store 140 are removed.

If a newly-calculated fingerprint matches an existing fingerprint, it indicates that the section of data identified by the fingerprint has already been stored in raw data 155. Accordingly, another copy of that section does not need to be stored. When a match occurs for the fingerprint identifying a particular section of an incoming data stream, deduplication match module 120 can notify stream generator 130, which is described in more detail below, that a match has been detected. Since the fingerprint matches an existing fingerprint in fingerprint store 140, deduplication match module 120 does not need to add that fingerprint to the store (however, deduplication match module 120 may, in some embodiments, update the fingerprint store to indicate that the particular fingerprint has been more recently used, which may delay when that fingerprint ages out of the fingerprint store).

If instead the newly-calculated fingerprint does not match any of the fingerprints in fingerprint store 140, deduplication match module 120 can notify stream generator 130 that no match was found. Deduplication match module 120 can also add the newly-calculated fingerprint to fingerprint store 140, so that if the same section of data is later included in a backup stream, that data can then be deduplicated.

Stream generator 130 generates the reference and data streams that make up a backup stream and stores those streams in data store 150. In particular, the data streams are added to raw data 155, and the reference streams identify (e.g., by identifying storage addresses) which fixed-length data segments within raw data 155 are part of each particular backup stream.

Stream generator 130 uses the information provided by deduplication match module 120 to determine whether a given section of data should be included in the backup's data stream or not. For example, if a match was detected for particular fingerprint, stream generator 130 determines that a copy of the section of data identified by that fingerprint is already stored within raw data 155. As such, instead of including that section of data in the data stream for the backup (and causing a duplicate copy of that section of data to unnecessarily be added to raw data 155), stream generator 130 can instead simply cause the backup's reference stream to refer to the already-stored section of data within raw data 155 and leave that section of data out of the backup's data stream.

If instead no fingerprint match was detected, it indicates that no copy of the section of data identified by the newly-calculated fingerprint already exists within raw data 155. Thus, stream generator 130 can add the section of data to the backup's data stream, which in turn causes that section of data to be added to raw data 155, and cause the reference file to refer to the newly-added section of data within raw data 155. Additionally, stream generator 130 can add metadata to fingerprint store 140 identifying the location of the fixed-size segment(s) of data containing the newly-added section of data within raw data 155. This metadata can be associated with the section of data's fingerprint and used to perform deduplication if that same section of data is later included in another incoming data stream.

As noted above, sections of data within an incoming data stream can be of variable length. As a result of this, some of the variable-size sections of data may not align with the fixed-size data representation used by the underlying system. For example, the underlying system may align data in fixed-size blocks, but variable-sized sections may begin or end in the middle of a block. As a result of this, a variable-length section of data may not perfectly align with the fixed-size data segments in raw data 155. Instead, that variable-length section may begin somewhere in the middle of a fixed-size segment and/or end somewhere in the middle of a fixed-size segment. Furthermore, a variable-length section may span multiple fixed-size segments.

Because of this potential discrepancy, to perform hybrid deduplication, the reference stream will identify every fixed-size segment that includes any portion of the variable-length segment, even if that fixed-size segment also includes data that is not part of the variable-length segment. In some embodiments, the reference stream may also include information identifying what portion of a given fixed-size segment is part of the variable-length segment.

In some embodiments, an underlying file system (such as VERITAS File System (VxFS), provided by Symantec Corporation of Cupertino, Calif.) or other application (e.g., an intelligent disk array controller, a network appliance, a volume manager, or the like) for organizing data storage can maintain the reference streams as part of the file system (or other application) metadata in a manner that prevents a given fixed-size segment from being deleted from raw data 155 until every reference stream that refers to that fixed-size segment has been deleted. This prevents a reference stream from referring to a non-existent fixed-size segment. As an example, a data stream of a given backup can be maintained as a file within the file system, and the reference stream for that backup can include the file system metadata that identifies the blocks within that file. The file system can allow multiple files to contain the same blocks, such that two different backups can each include a data stream that includes the same data block. The reference streams for each backup will include the file system metadata that identifies, for each file, the blocks within that file. Reference generator 130 can create reference streams in such an embodiment by interacting with the underlying file system (e.g., by telling the file system that certain blocks of the new data stream are virtual copies of blocks already stored in another data stream).

By using an underlying mechanism such as a file system to prevent a shared fixed-size segment from being deleted as long as there is one or more reference stream that identifies that fixed-size segment, backup module 90 effectively delegates the management of this aspect of data deduplication to the underlying mechanism. Thus, instead of needing to maintain reference counts for each fixed-size segment (in many deduplication systems, such reference counts indicate the number of times a segment is shared, and a segment cannot be deleted until its reference count indicates that it is no longer shared more than once), backup module 90 simply relies upon the file system to maintain data integrity for the deduplicated data streams.

Figure 2:
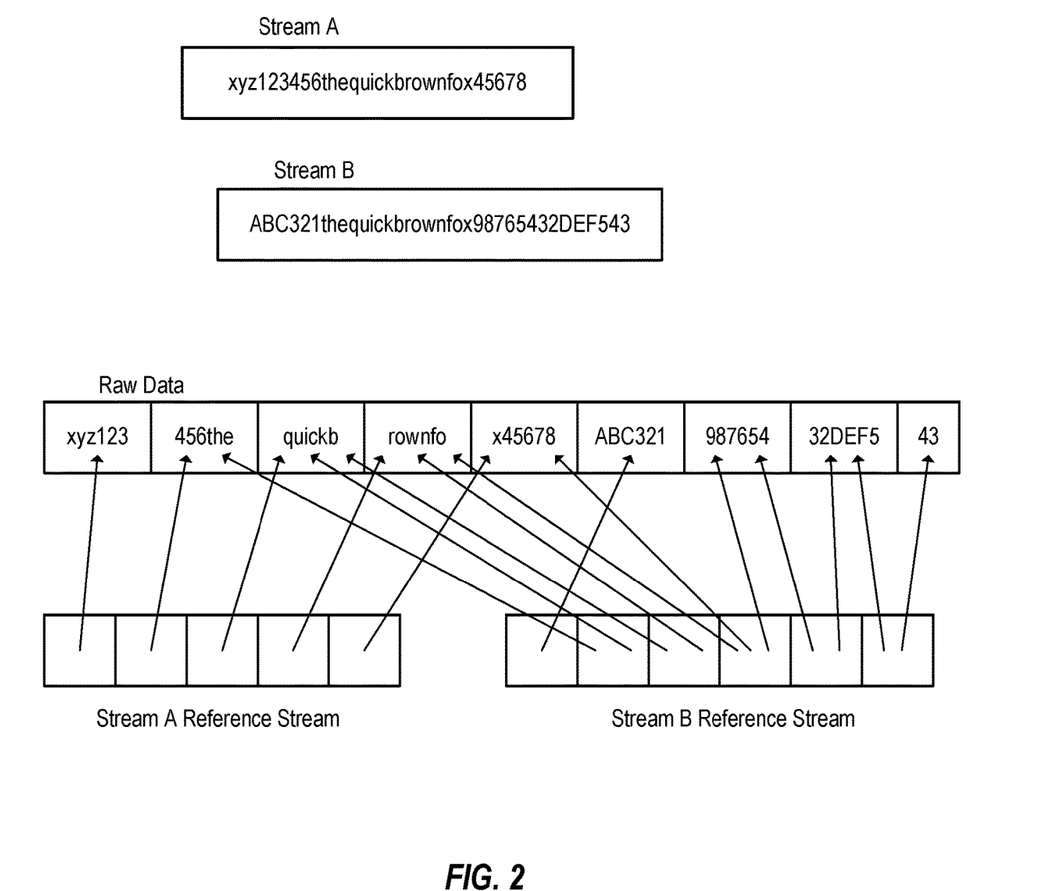
FIG. 2 is an example of how two data streams can be deduplicated for storage in a deduplicated data store, according to one embodiment.

FIG. 2 shows a simplified example of how two incoming data streams can contain the same variable-sized section of data, and how hybrid deduplication can be performed on those two incoming data streams. As shown, both Stream A and Stream B contain the text string "thequickbrownfox," albeit at different offsets within their respective streams. Because these streams contain the same content in a manner that is unaligned with each other, simply comparing fixed-size segments of the two streams would be unlikely to detect the presence of the shared content, and thus it would not be possible to deduplicate the common data. However, variable-length match detection, such as that performed by variable-length fingerprint module 110 of FIG. 1, is much more likely to detect that the two streams share common data. As such, this example presumes Stream A was written to a deduplicated data store first, and that when Stream B entered the system, a match was detected for the data section containing "thequickbrownfox".

As shown, the deduplicated data store ("Raw Data") has stored all of Stream A into five fixed-size segments. The reference stream for Stream A identifies these segments as being part of Stream A, as indicated by the pointers in that reference stream pointing to the five segments that store Stream A's content. The variable-sized section of data that is shared with Stream B begins in the middle of the second fixed-size segment (from the left) and ends in the middle of the fifth fixed-size segment.

When Stream B is written to the deduplicated data store, the new, non-matching sections of Stream B are added to the deduplicated data store, starting at the sixth fixed-size segment of Raw Data. Stream B's reference stream points to the sixth segment to indicate that it stores the first section of Stream B. The next section of Stream B is the shared section. Accordingly, instead of re-adding this section to Raw Data, Stream B's reference stream simply points to the fixed-size segments that already store this content, which are the second through fifth segments of Raw Data. Even though the second and fifth segments also store data that is not part of Stream B, Stream B's reference stream still points to these segments. (In some embodiments, Stream B's reference stream may also identify the particular portions of these segments that store the data that is part of Stream B.)

The next section of Stream B is not shared with Stream A, and so this section is written to Raw Data in the seventh through ninth fixed-size segments, and appropriate pointers are added to Stream B's reference stream. It is noted that the last fixed-size segment only partially contains data for Stream B.

Figure 3:
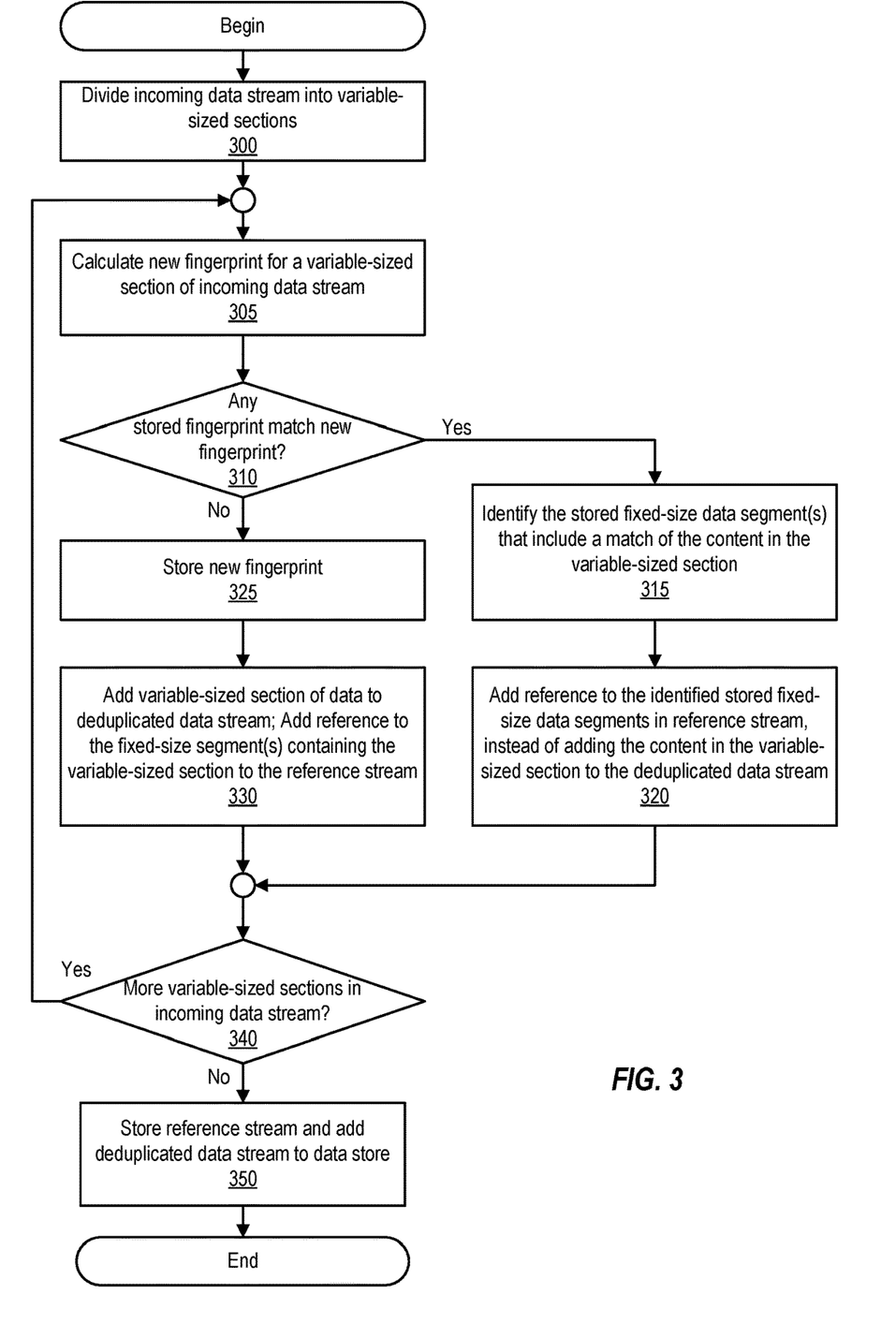
FIG. 3 is flowchart illustrating how data can be deduplicated, according to one embodiment.

FIG. 3 is a flowchart illustrating a method of performing hybrid deduplication. This method can be performed by a hybrid deduplication module such as that shown in FIG. 1.

The method begins at 300, when an incoming data stream is subdivided into variable-length sections (e.g., according to a rolling window algorithm or other algorithm for detecting matching, variable-length, unaligned content within different data streams). The length of these sections can vary, such that some sections have different lengths than other sections within the same data stream. Additionally, some of these sections may be overlapping, such that some content is shared between two sections.

For a given variable-length section of the data stream, a fingerprint (or other appropriate identifier usable to compare the content of one section to another) is calculated, as shown at 305. This fingerprint is then compared to several pre-existing fingerprints, as shown at 310. The pre-existing fingerprints identify variable-length sections of data that have already been stored. If the fingerprint matches one of the pre-existing fingerprints, it indicates that the section of data represented by the fingerprint has already been stored.

Thus, if the fingerprint matches an existing fingerprint, the section of data can be deduplicated. As shown at 315, the fixed-size segment(s) of the underlying storage that already store a copy of the section of data are identified (e.g., by looking up a set of block addresses or other identifying information that is associated with the matching pre-existing fingerprint). Then, instead of writing another copy of the section of data to the storage (by adding that section to the deduplicated data stream being created for the incoming data stream), the reference file for the incoming data stream is simply updated to identify the fixed-size segments that already store the section of data, as shown at 320.

It is noted that the identified fixed-size segments may not have the same alignment as the section of data, such that there may be additional content, which is not part of the section of data or the incoming data stream, at the beginning and/or end of the fixed-size segments. In some embodiments, the reference file may additionally specify which of the data in the shared fixed-length segments is and is not part of the associated data stream.

Returning to 310, if the fingerprint does not match any of the existing fingerprints, it indicates that the section of data has not already been stored. Accordingly, the fingerprint of that section of data is stored for use in subsequent deduplication at 325. That section of data is added to the deduplicated data stream being written to the underlying storage, and the reference file for the incoming data stream is modified to identify the fixed-size data segments allocated to store the section of data, as shown at 330.

Operation 310 is repeated for each variable-sized section of data in the incoming data stream, as indicated at 340. The deduplicated data stream and associated reference stream are written to the underlying data store, as shown at 350 (this operation may actually be performed during the performance of the other operations of FIG. 3).

Returning to FIG. 1, in this example, a hybrid deduplication module 100 is part of a backup module 90 that is configured to perform hybrid deduplication as part of the backup process. However, in other embodiments, hybrid deduplication may be performed outside of the backup context.

Furthermore, the illustrated example shows a system in which backups are performed over a network for several different backup clients. In alternative embodiments, the entire system (client, backup module, and backup storage) may all be contained within a single computing device.

Returning to Clients A-C, please note that the number of clients can vary among systems and embodiments. Each of the clients can be implemented as a computing device such as a personal computer, laptop computer, server, personal digital assistant, cell phone, or the like. Similarly, backup module 90 can be implemented on a computing device. A detailed example of a computing device is illustrated in FIG. 4, as described below.

Data store 150 is a storage device for storing data. Such a storage device can provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Figure 4:
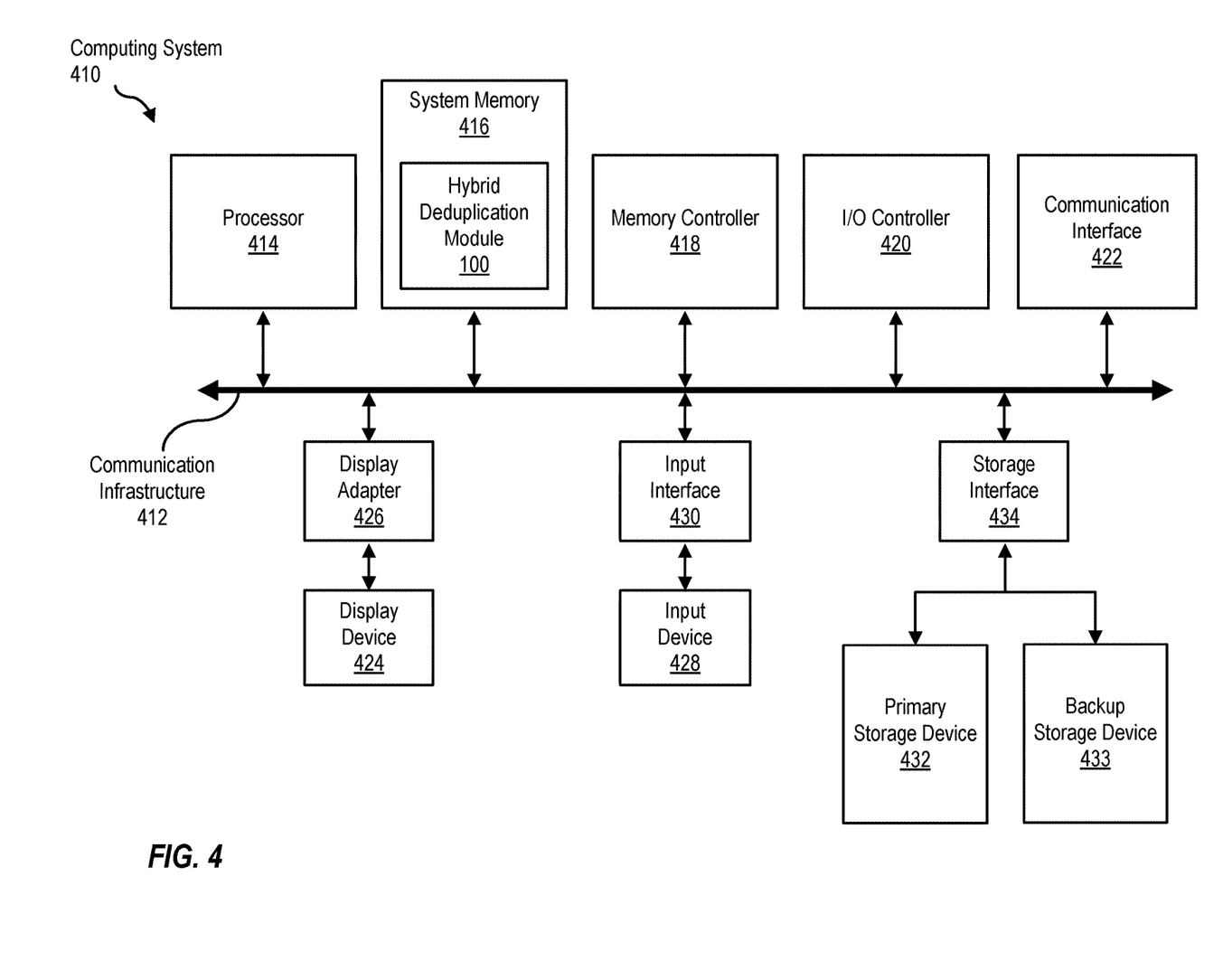
FIG. 4 is a block diagram of a computing system that implements a hybrid deduplication module, according to one embodiment.

FIG. 4 is a block diagram of a computing system 410 that includes a hybrid deduplication module as described above. Computing system 410 broadly represents any single or multi-processor computing device or system capable of executing computer-readable instructions. Examples of computing system 410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 410 may include at least one processor 414 and a system memory 416. By executing the software that implements a hybrid deduplication module 100, computing system 410 becomes a special purpose computing device that is configured to perform hybrid deduplication that detects deduplication matches on variable-size sections of data and then deduplicates storage in fixed-size segments of data.

Processor 414 generally represents any type or form of processing unit capable of processing data or interpreting and executing instructions. In certain embodiments, processor 414 may receive instructions from a software application or module. These instructions may cause processor 414 to perform the functions of one or more of the embodiments described and/or illustrated herein. For example, processor 414 may perform and/or be a means for performing the operations described herein. Processor 414 may also perform and/or be a means for performing any other operations, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, program instructions executable to implement an advisory metadata module 64 (e.g., as shown in FIG. 1) may be loaded into system memory 416.

In certain embodiments, computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the operations or features described and/or illustrated herein.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, computing system 410 may also include at least one input device 428 coupled to communication infrastructure 412 via an input interface 430. Input device 428 generally represents any type or form of input device capable of providing input, either computer or human generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. A storage device like primary storage device 432 can store information such as advisory metadata, non-advisory metadata, and file system objects such as files and directories.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4.

Computing system 410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 410 for storage in memory via a network such as the Internet or upon a carrier medium.

The non-transitory computer-readable medium containing the computer program may be loaded into computing system 410. All or a portion of the computer program stored on the non-transitory computer-readable medium may then be stored in system memory 416 and/or various portions of storage devices 432 and 433. When executed by processor 414, a computer program loaded into computing system 410 may cause processor 414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 410 may be configured as an application specific integrated circuit (ASIC) adapted to implement one or more of the embodiments disclosed herein.

Figure 5:
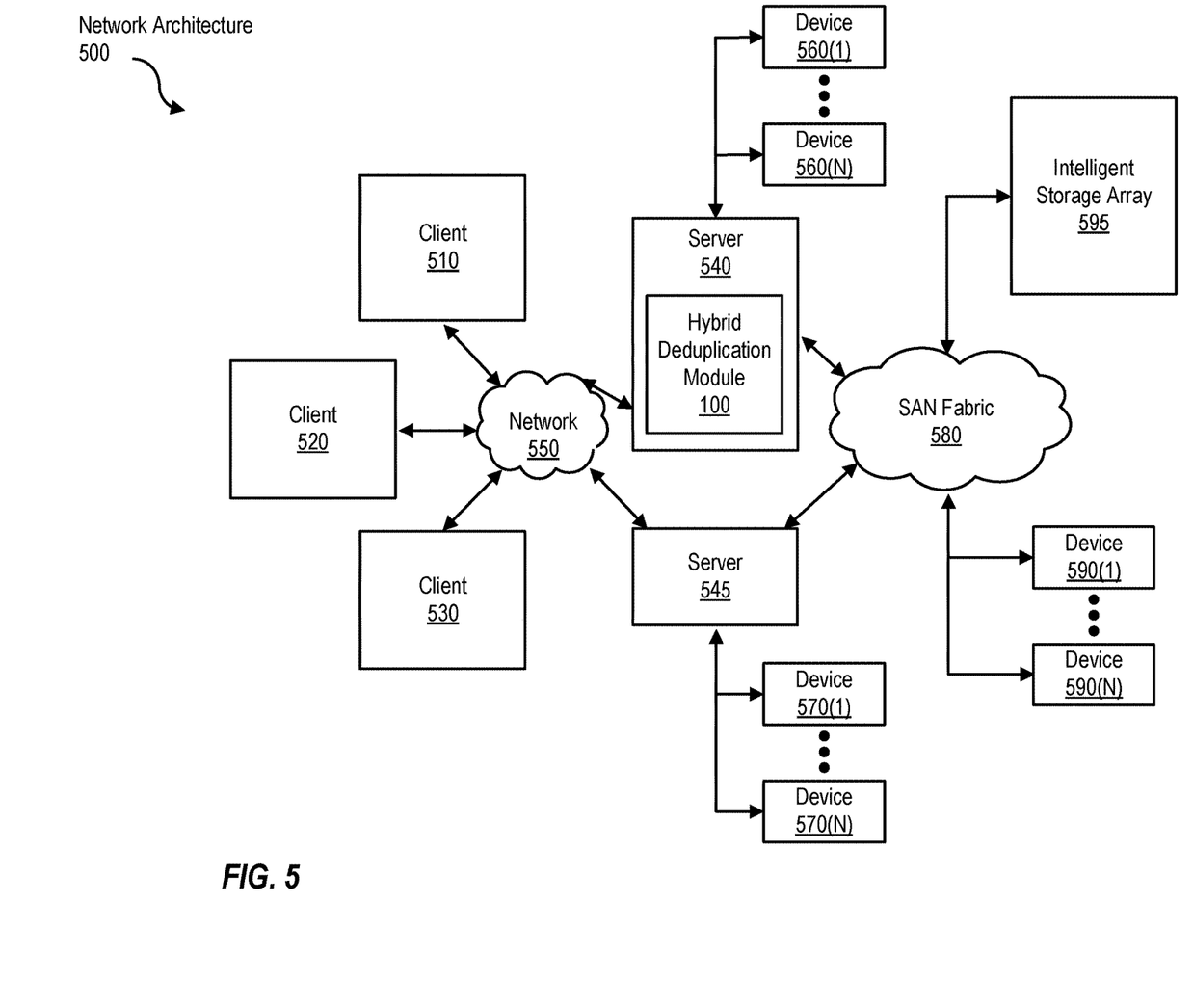
FIG. 5 is a block diagram of a networked computing system that implements a hybrid deduplication module, according to one embodiment.

FIG. 5 is a block diagram of a network architecture 500 in which client systems 510, 520, and 530 and servers 540 and 545 may be coupled to a network 550. Client systems 510, 520, and 530 generally represent any type or form of computing device or system, such as computing system 410 in FIG. 4.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, one or more of servers 540 and 545 and/or client systems 510, 520, and 530 may include hybrid deduplication module 100 as shown in FIG. 1.

As illustrated in FIG. 5, one or more storage devices 540(1)-(N) may be directly attached to server 540. Similarly, one or more storage devices 570(1)-(N) may be directly attached to server 545. Storage devices 540(1)-(N) and storage devices 570(1)-(N) generally represent any type or form of storage device or medium capable of storing data and/or other computer-readable instructions. In certain embodiments, storage devices 540(1)-(N) and storage devices 570(1)-(N) may represent network-attached storage (NAS) devices configured to communicate with servers 540 and 545 using various protocols, such as Network File System (NFS), Server Message Block (SMB), or Common Internet File System (CIFS). Such storage devices can store advisory metadata, non-advisory metadata, and file system objects, as described above.

Servers 540 and 545 may also be connected to a storage area network (SAN) fabric 580. SAN fabric 580 generally represents any type or form of computer network or architecture capable of facilitating communication between multiple storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 540(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to computing system 410 of FIG. 4, a communication interface, such as communication interface 322 in FIG. 5, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 540(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 540, server 545, storage devices 540(1)-(N), storage devices 570(1)-(N), storage devices 590(1)-(N), intelligent storage array 595, or any combination thereof. All or a portion of one or more of the embodiments disclosed herein may also be encoded as a computer program, stored in server 540, run by server 545, and distributed to client systems 510, 520, and 530 over network 550.

In some examples, all or a portion of one of the systems in FIGS. 1, 4, and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a hybrid deduplication module may transform a data stream into a deduplicated data stream and a reference file.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a data stream;
   dividing the data stream into a plurality of variable-sized sections;
   calculating a fingerprint for a first variable-sized section of the plurality of variable-sized sections, wherein
      the fingerprint is calculated as a function of all data within the first variable-sized section;
   determining whether the fingerprint matches a stored fingerprint;
   in response to determining that the fingerprint matches the stored fingerprint, identifying a fixed-length data segment in storage that contains a copy of data in the first variable-sized section, wherein
      the fixed-length data segment comprises
         the copy, and
         additional data that is not found in the first variable-sized section;
   replacing the first variable-sized section with a plurality of references including a reference to the fixed-length data segment; and
   updating a reference file to identify
      the fixed-length data segment,
      a first portion of data in the fixed-length data segment that corresponds to the copy, and
      a second portion of data in the fixed-length data segment that corresponds to the additional data.

2. The method of claim 1, further comprising:
   calculating a second fingerprint corresponding to a second variable-sized section of the plurality of variable-sized sections;
   determining that the second fingerprint does not match any stored fingerprint;
   in response to determining that the second fingerprint does not match any stored fingerprint, store fixed-length data segments of the second variable-sized section in the storage; and replacing the second variable-sized section with a plurality of references including the references to the fixed-length data segments of the second variable-sized section in the storage.

3. The method of claim 1, wherein
at least two or more of the plurality of variable-sized sections comprise unaligned common data.

4. A non-transitory computer readable storage medium comprising program instructions executable by one or more processors to perform a method comprising:
receiving a data stream;
dividing the data stream into a plurality of variable-sized sections;
calculating a fingerprint for a first variable-sized section of the plurality of variable-sized sections, wherein
the fingerprint is calculated as a function of all data within the first variable-sized section;
determining whether the fingerprint matches a stored fingerprint;
in response to determining that the fingerprint matches the stored fingerprint, identifying a fixed-length data segment in storage that contains a copy of data in the first variable-sized section, wherein
the fixed-length data segment comprises
the copy, and
additional data that is not found in the first variable-sized section;
replacing the first variable-sized section with a plurality of references including a reference to the fixed-length data segment; and
updating a reference file to identify
the fixed-length data segment,
a first portion of data in the fixed-length data segment that corresponds to the copy, and
a second portion of data in the fixed-length data segment that corresponds to the additional data.

5. The non-transitory computer readable storage medium of claim 4, wherein the method further comprises:
calculating a second fingerprint corresponding to a second variable-sized section of the plurality of variable-sized sections;
determining that the second fingerprint does not match any stored fingerprint;
in response to determining that the second fingerprint does not match any stored fingerprint, store fixed-length data segments of the second variable-sized section in the storage; and
replacing the second variable-sized section with a plurality of references including the references to the fixed-length data segments of the second variable-sized section in the storage.

6. The non-transitory computer readable storage medium of claim 4, wherein
at least two or more of the plurality of variable-sized sections comprise unaligned common data.

7. A system comprising:
one or more processors; and
a memory storing program instructions executable by the one or more processors to perform a method comprising:
receiving a data stream;
dividing the data stream into a plurality of variable-sized sections;
calculating a fingerprint for a first variable-sized section of the plurality of variable-sized sections, wherein
the fingerprint is calculated as a function of all data within the first variable-sized section;
determining whether the fingerprint matches a stored fingerprint;
in response to determining that the fingerprint matches the stored fingerprint, identifying a fixed-length data segment in storage that contains a copy of data in the first variable-sized section, wherein
the fixed-length data segment comprises
the copy, and
additional data that is not found in the first variable-sized section;
replacing the first variable-sized section with a plurality of references including a reference to the fixed-length data segment; and
updating a reference file to identify
the fixed-length data segment,
a first portion of data in the fixed-length data segment that corresponds to the copy, and
a second portion of data in the fixed-length data segment that corresponds to the additional data.

8. The system of claim 7, wherein the method further comprises:
calculating a second fingerprint corresponding to a second variable-sized section of the plurality of variable-sized sections;
determining that the second fingerprint does not match any stored fingerprint;
in response to determining that the second fingerprint does not match any stored fingerprint, store fixed-length data segments of the second variable-sized section in the storage; and
replacing the second variable-sized section with a plurality of references including the references to the fixed-length data segments of the second variable-sized section in the storage.

9. The system of claim 7, wherein
at least two or more of the plurality of variable-sized sections comprise unaligned common data.

* * * * *